United States Patent [19]
Montalvo et al.

[11] Patent Number: 5,521,777
[45] Date of Patent: May 28, 1996

[54] AUTOMATIC APPARATUS FOR SELECTIVELY SLIDING A WRITE-PROTECT TAB

[75] Inventors: Samuel A. Montalvo, Cupertino; Phillip J. Kronzer, Los Gatos, both of Calif.

[73] Assignee: Autodisc Incorporated, Campbell, Calif.

[21] Appl. No.: 334,521

[22] Filed: Nov. 4, 1994

[51] Int. Cl.[6] ............ G11B 15/04; G11B 19/04; G11B 17/08
[52] U.S. Cl. .............. 360/98.06; 360/60; 360/137
[58] Field of Search ............... 360/98.06, 99.06, 360/60, 98.01, 98.02, 98.03, 98.04, 98.05, 98.07, 137, 34, 133; 369/191, 192, 193, 291, 292, 36, 275.5

[56]       References Cited
U.S. PATENT DOCUMENTS 4,760,473  7/1988  Takikawa et al. ............ 360/60
5,128,912  7/1992  Hugh et al. ............... 369/34
5,386,406  1/1995  Ikuma et al. ............ 360/99.06

Primary Examiner—John H. Wolff
Assistant Examiner—Adriana Giordana
Attorney, Agent, or Firm—Schneck & McHugh

[57]       ABSTRACT

An apparatus for switching a write-protect tab of a computer disk includes a supply hopper for storing a plurality of disks and includes a mechanism for delivering the disks in a one-by-one manner to a switching area. At the switching area, a tungsten carbide tip is caused to move vertically into contact with a major surface of the tab, and then horizontally to slide the tab into the desired position. The tungsten carbide tip includes teeth that are arranged in mirror-imaged first and second sets, so that the apparatus operates equally well in either switching direction. After the tab has been moved to the desired position, the disk is delivered to the disk-receiving hopper and elevated to accommodate delivery of the next disk.

17 Claims, 4 Drawing Sheets

AUTOMATIC APPARATUS FOR SELECTIVELY SLIDING A WRITE-PROTECT TAB

TECHNICAL FIELD

The invention relates generally to automated handling apparatus for computer disks and more particularly to apparatus for switching a write-protect switch.

BACKGROUND ART

A computer disk typically includes a write-protect tab that can be used to reduce the chances that data on the disk will be inadvertently erased or modified. The tab may be slid between a write-enabled position and a write-disabled position. A sensing mechanism in a computer system detects the position of the tab when the disk is inserted into the system. If the tab is determined to be in the write-disabled position, the computer system will read the data on the disk, but will not write data onto the disk. U.S. Pat. No. 4,760,473 to Takikawa et al. describes a device for use in a computer disk drive to determine whether writing onto a disk is to be enabled or disabled.

Typically, manual manipulation of the write-protect tab between the two positions is sufficient. However, manual switching of a large number of disks is both tiresome and labor-intensive. In a mass distribution of a particular computer program, a duplicator may record the program on 3.5 inch disks or 5.25 inch disks. The write-protect tabs of the collection of 3.5 inch disks may then be switched to the write-disabled positions. While there are automated devices for performing the switching, the switching is typically performed by hand.

At times, it is desirable to return a collection of prerecorded disks to the write-enabled position. For example, a collection of unsold prerecorded disks may be reused to contain a different program or an upgrade of the original program, if the tab is switched to allow the new program to be recorded.

It is an object of the present invention to provide an apparatus for providing automated switching of write-protect tabs on a collection of computer disks. A further object is to provide such an apparatus in which the automated switching is bi-directional.

SUMMARY OF THE INVENTION

The above objects have been met by an automated switching apparatus having a reciprocating device, such as a solenoid-actuated member. In the preferred embodiment, a tip member has a first set of teeth for sliding the write-protect tab in a first direction and has a second set of teeth for sliding the tab in the opposite direction. The configuration of teeth of the first set is preferably a mirror image of the configuration of teeth in the second set.

A stack of computer disks is stored in a supply hopper. The disks are delivered to a tab-switching area in a one-by-one manner. A pusher plate may be used to remove a lowermost disk from the hopper and to deliver the disk to the tab-switching area. Other embodiments are also contemplated.

Within the tab-switching area, the disk is held firmly in position. The tip member is moved into contact with a major surface of the tab. Typically, the movement to the tab has a major directional component in the vertical. Horizontal movement is then initiated to achieve the desired switching of the tab.

Driving circuitry may be switched to reverse the direction of the tip member during the switching action. That is, the tip member may be moved to switch the tab from a write-enabled position to a write-disabled position, or the switching may be in the opposite direction.

A tungsten carbide tip member provides reliable results. Tungsten carbide teeth engage the major surface of the tab in a manner to dependably switch the tab position. The tungsten carbide tip may be fixed to a steel member in order to reduce the cost of manufacture.

Preferably, the apparatus includes a second hopper that receives the disks and stacks them in an orderly fashion. For example, a disk may be removed from the tab-switching area and then elevated in order to provide clearance for a subsequently removed disk.

An advantage of the invention is that the apparatus reduces both the time and the labor required to switch the write-protect tabs of a group of computer disks. Processing of 2700 disks within a single hour by a single operator has been achieved with one machine. A single operator may operate more than one machine since the only operator-required tasks are those of loading and unloading the hoppers.

BEST MODE FOR CARRYING OUT THE INVENTION

Figure 1:
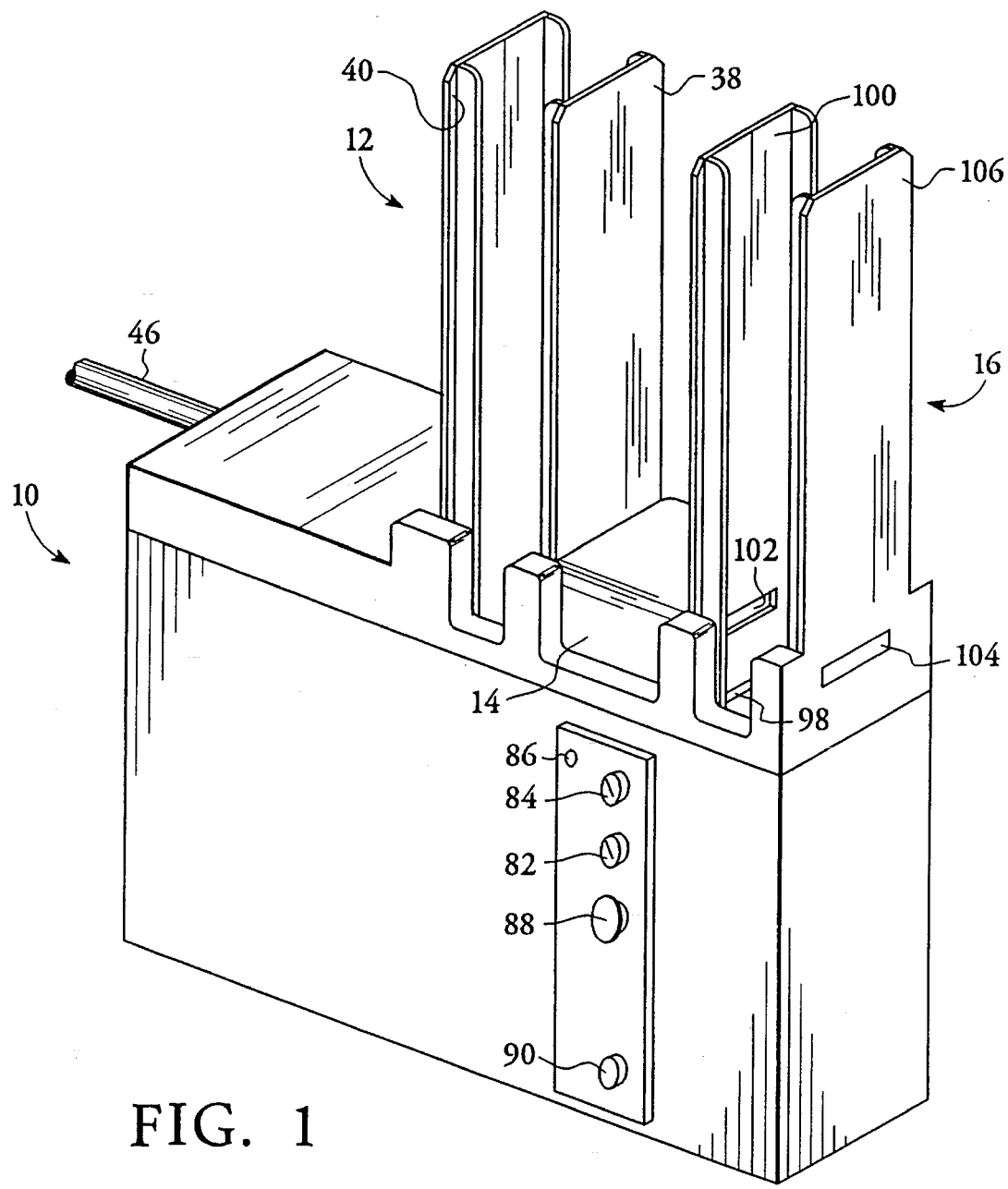
FIG. 1 is a perspective view of an apparatus for automated switching of a write-protect tab in accordance with the invention.

With reference to FIG. 1, an automated apparatus 10 includes a disk-supply hopper 12, a tab switching area 14 and a disk-receiving hopper 16. As will be explained more fully below, a pusher plate slides horizontally to move computer disks from the disk-supply hopper 12 to the tab-switching area 14, and subsequently to the disk-receiving hopper 16.

Figure 2:
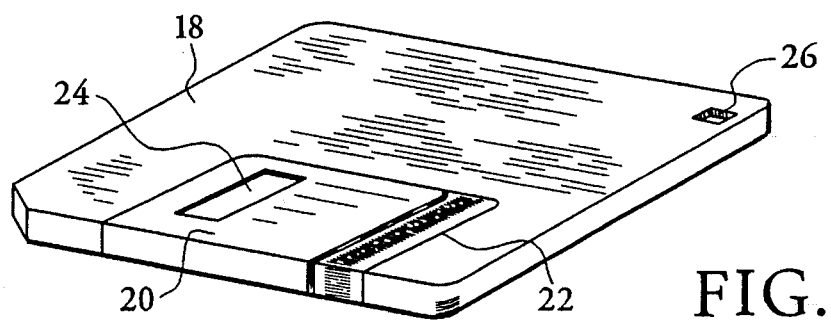
FIG. 2 is a perspective view of a 3.5-inch computer disk for use with the automated apparatus of FIG. 1.

Referring now to FIG. 2, a 3.5-inch disk 18 is shown as including a metal shutter 20 that slides along one edge of the disk. In the position shown in FIG. 2, the shutter covers a window to magnetic material onto which information is recorded. In use, the shutter is moved to abut a stop edge 22, thereby aligning an opening 24 in the shutter with the window to the magnetic material.

The computer disk 18 includes a write-protect tab that slides relative to the remainder of the disk to selectively close a tab window 26. In one position, the write-protect tab disables writing onto the magnetic material of the disk. In the other position, writing is enabled. A computer system typically includes a detection mechanism to determine whether the write-protect tab is in the position to close the tab window 26. The detection mechanism may be mechanical or optical, and is not important to the apparatus of FIG. 1. The apparatus is designed to provide automated switching of the write-protect tab.

A concern with stacking a number of computer disks 18 in the disk-supply hopper 12 and then sliding a lowermost disk from below the remainder of the stack is that the metallic shutters 20 may be scratched. While such scratches do not adversely affect operation of disks, disks having scratched shutters are typically outside of quality control standards, since a scratch does affect marketability. Consequently, scratches on disk shutters reduce the manufacturing yield. The disk-supply hopper 12 therefore includes structure designed to minimize sliding of the lowermost disk against the next lowermost disk.

Figure 3:
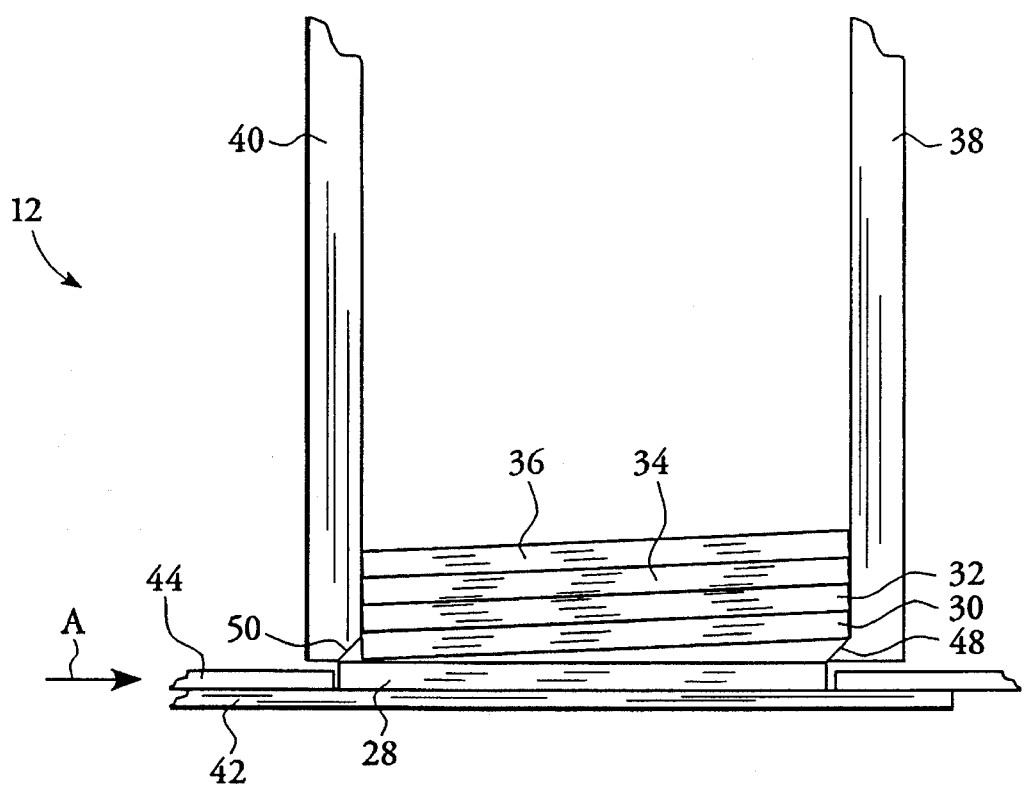
FIG. 3 is a side view of a disk-supply hopper of FIG. 1.
Figure 4:
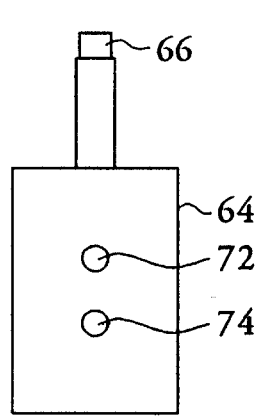
FIG. 4 is an end view of a tip member for displacement of a write-protect switch of FIG. 2.
Figure 5:
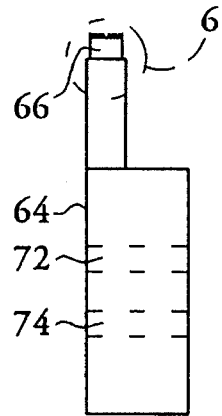
FIG. 5 is a side view of the tip member of FIG. 3.

FIG. 3 illustrates a bottom portion of the disk-supply hopper 12. Five computer disks 28, 30, 32, 34 and 36 are shown within the hopper. The hopper includes a forward wall 38 and a rearward wall 40. The lowermost disk 28 rests on a stationary plate 42. Also resting on the stationary plate is a slidable pusher plate 44. Forward movement of the pusher plate, as indicated by arrow A, moves the disks from below the remainder of the stack of computer disks.

In FIG. 1, a pneumatic cylinder 46 is shown. The pneumatic cylinder is controlled to move the pusher plate 44 of FIG. 3 forwardly and rearwardly. A first forward movement causes the lowermost disk 28 to be delivered to the tab-switching area 14 of the automated apparatus 10. However, the arrangement of FIG. 3 minimizes sliding contact of the disk 28 against the next lowermost disk 30. A single line of contact between the two disks 28 and 30 is maintained near the rearward ends of the disks. The next lowermost disk rests at an angle to the disk 28 that is abutted by the pusher plate 44. The forward wall 38 of the hopper 12 has an outwardly sloped surface 48 that projects into a spacing between the disks 28 and 30.

The next lowermost disk 30 rests at its forward end against the outwardly sloped surface 48 of the forward wall 38. At the opposite end of the disk 30 is an inwardly sloped surface 50 of the bottom of the rearward wall 40. The mass of the disk 30 is sufficient to provide a gravitational force for sliding the forward end of the disk along the outwardly sloped surface 48, but contact of the disk with the inwardly sloped surface 50 fixes the disk 30 in the illustrated position until the lowermost disk 28 has been moved from its position. Thus, when the pusher plate 44 is moved in the direction of arrow A to release the lowermost disk 28, the single line of contact at the rearward ends of the disks is transferred to the upper surface of the pusher plate. Then, when the pusher plate returns to the position of FIG. 3, the rearward end of the disk 30 drops into the position previously held by disk 28. Each of the other disks 32, 34 and 36 is thereby lowered one position.

The vertical extent of the inwardly sloped surface 50 is preferably less than the vertical extent of the disk 30. This prevents the disk from prematurely entering the spacing provided by the inwardly sloped surface. A typical height of a 3.5-inch disk is 0.125 inch. For such a disk, the vertical height of the inwardly sloped surface 50 may be 0.1 inch. While not critical, the outwardly sloped surface 48 of the forward wall 38 may geometrically correspond to the inwardly sloped surface 50. The height may be 0.1 inch. This height is designed to ensure that the metal shutter of the lowermost disk 28 is spaced apart from the shutter of the next lowermost disk 30 as the pusher plate 44 is moved forwardly. The angle of the outwardly sloped surface 48 is designed to ensure a smooth travel of the forward end of the disk 30 along the sloped surface.

Figure 8:
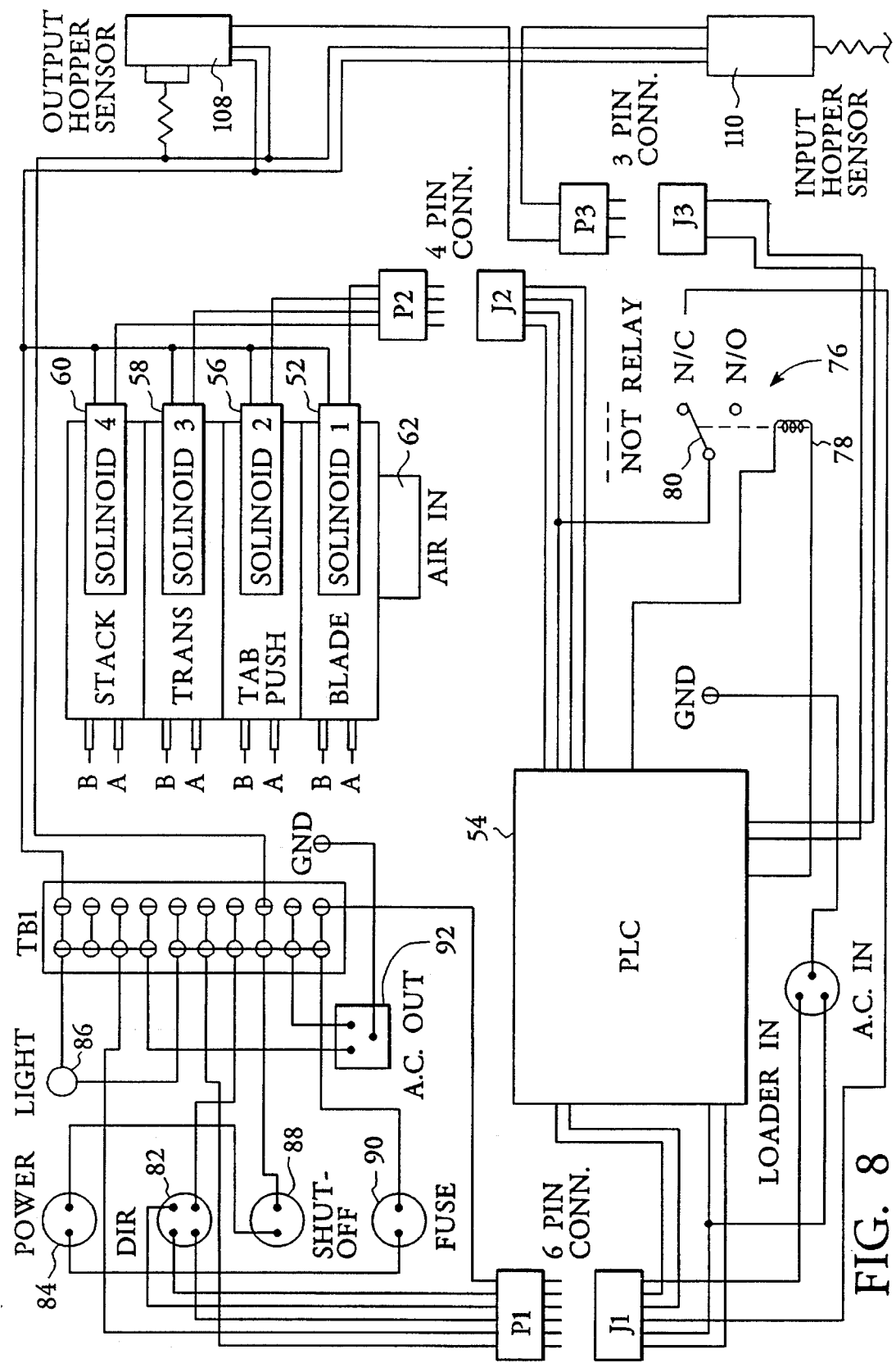
FIG. 8 is an electrical schematic view of the apparatus of FIG. 1.

Referring briefly to FIG. 8, a solenoid 52 is selectively activated by a programmable logic controller (PLC) 54 to control the position of the pusher plate. The PLC operates three other solenoids 56, 58 and 60, as well. Each of the solenoids includes an "A" pneumatic line and a "B" pneumatic line. The activation of the solenoids determines whether the "A" line or the "B" line is linked to "Air In" 62. An acceptable air pressure is 80 psi, but this is not critical to the invention.

FIGS. 3–6 illustrate a tip member 64 that is controlled to switch the write-protect tab of a computer disk. The tip member is primarily formed of steel, but includes a tungsten carbide tip 66. It is the tungsten carbide tip that contacts the write-protect tab. The material is selected for its hardness and consequent ability to securely engage the tab which is typically formed of polymeric material.

Figure 6:
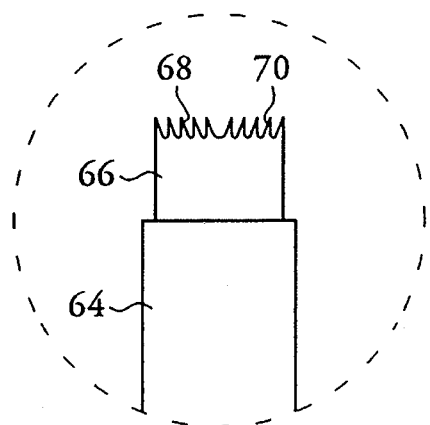
FIG. 6 is a side view of a tip of a tip member, taken within circle 5 of FIG. 4.

As best seen in FIG. 6, the tungsten carbide tip 66 includes a first set of teeth 68 and a second set of teeth 70 that is a mirror image of the first set. The first set of teeth 68 is oriented to engage a tab to be moved in one direction, while the second set of teeth 70 is oriented to engage a tab to be moved in the opposite direction.

Each tooth 68 of the first set may be considered to have a forward surface at the left and a rearward surface at the right, given the position of the tip 66 as shown in FIG. 6. The forward surface at the right is substantially vertical in order to provide a high teeth-to-tab traction when the write-protect tab of disk is to be moved to the left. The rearward surface of each tooth 68 has a slope designed to provide structural integrity without adversely affecting teeth-to-tab traction. The pitch of the teeth 68 within the first set may be 0.016 inch, but this is not critical. As previously noted, the second set of teeth 70 is a mirror image of the first set. The distance between the first and second sets may be 0.037 inch.

While the tip member 64 may be formed of tungsten carbide, the use of steel reduces the cost of the assembly. The tungsten carbide tip 66 may be silver soldered to the steel tip member. The tip member includes a pair of through holes 72 and 74 for securing the tip member to structure for moving the tip member relative to a write-protect tab of a computer disk.

Returning to FIG. 8, the tip member is controlled by both the second solenoid 56 and the third solenoid 58. The second solenoid 56 provides vertical displacement of the tip member to either bring the teeth 68 and 70 of the tip 66 into contact with the write-protect tab or to remove the teeth from contact with the tab. For example, activation of the second solenoid 56 by the PLC 54 may initiate positive air pressure along the associated pneumatic line "A," pushing the teeth 68 and 70 of FIG. 6 into contact with the tab. Deactivation then would return the tip member 64 to its original rest position.

The third solenoid 58 causes movement of the tip member 64 so as to switch the write-protect tab. For example, activation of the third solenoid 58 by the PLC 54 may cause the tab to be moved from the write-disabled position to the write-enabled position. However, a "not relay" 76 in FIG. 8 may be switched by the operator in order to reverse the direction of the solenoid 58 upon contact with the tab. That is, the not relay changes the direction of operation of tab switching. The not relay includes a coil 78 that controls the position of a relay contact 80. The use of a larger PLC would eliminate the need for the "not relay," but this is not critical and would be more costly.

Referring now to FIGS. 1 and 8, a direction switch 82 on the front panel of the apparatus 10 may be used to change the operation of the third solenoid 58 that displaces the tip member in a manner to slide the write-protect switch of a computer disk located within the tab-switching area 14.

The front panel of the apparatus 10 also includes a power switch 84. An on/off lamp 86 provides a visual indication of the power-up condition of the apparatus.

An emergency switch 88 may be used to quickly cease operation of the apparatus. Also shown on the front panel is a fuse 90. Preferably, an A.C. outlet is also available at the front panel. Such an outlet is shown at 92 in FIG. 8.

In operation, the pusher plate 44 shown in FIG. 3 moves forwardly upon activation of the first solenoid 52. As a result, the lowermost disk 28 slides along the upper surface of the stationary plate 42. The forward wall 38 is raised above the level of the stationary plate, providing clearance for forward movement of the disk 28.

Figure 7:
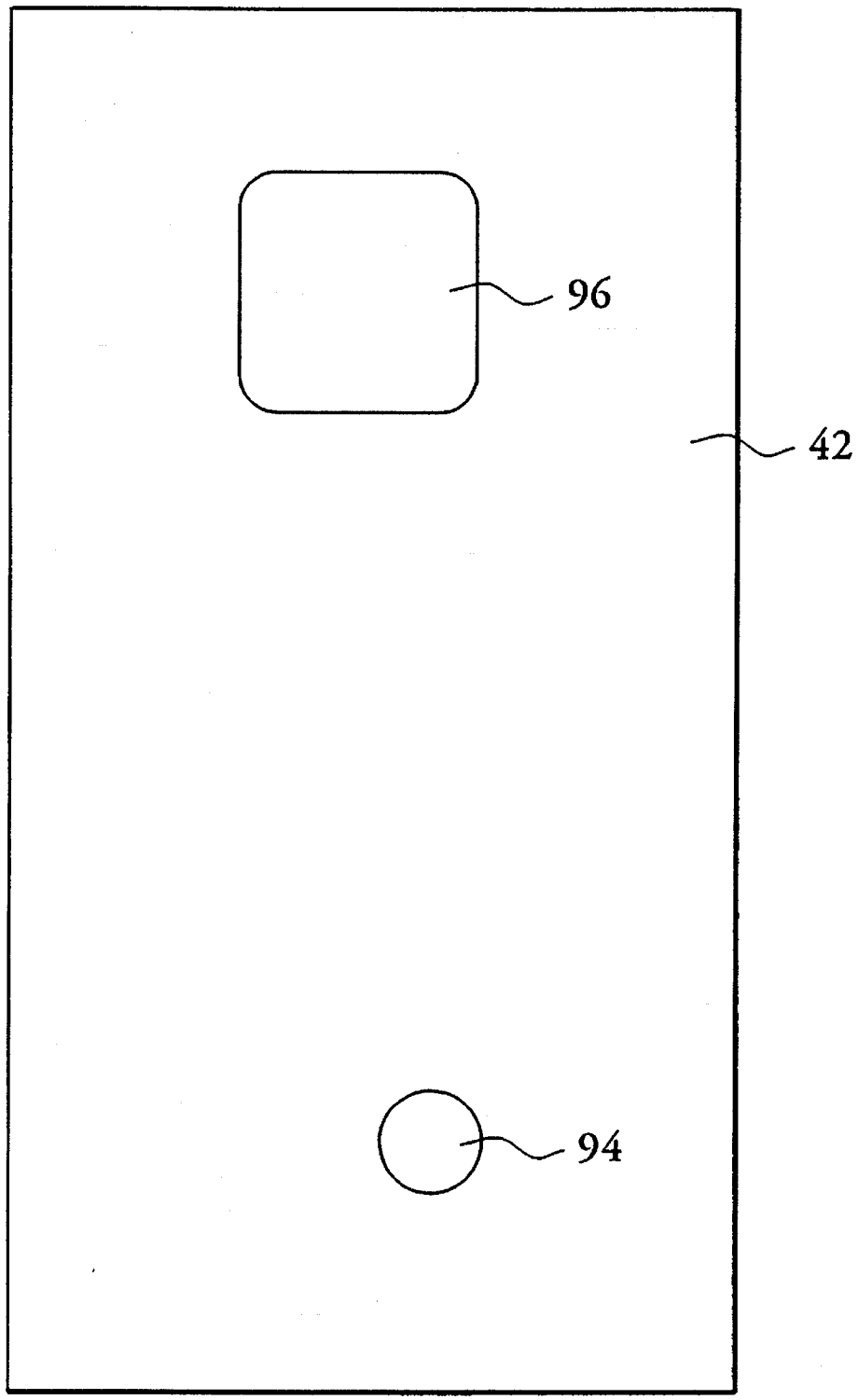
FIG. 7 is a top view of a stationary plate of FIG. 6.

The pusher plate 44 delivers the disk 28 to the tab-switching area 14 of FIG. 1. The stationary plate 42 can be seen in FIG. 7. When a disk is in the supply hopper, the disk is positioned above an optical window 94. The disk is caused to slide toward a second window 96. When aligned with the second window, the tip member 64 of FIGS. 4–6 has access to the write-protect tab of the computer disk. The second solenoid 56 of FIG. 8 brings the teeth 68 and 70 of the tip 66 into contact with the tab. Following the vertical movement of the tip 66, the third solenoid 58 initiates horizontal movement of the tip, thereby switching the position of the tab.

In FIG. 1, the tab-switching area 14 is shown as including structure for maintaining the position of the computer disk when tab switching is taking place. The disk is thereby prevented from being moved vertically by force imparted by the second and third solenoids 56 and 58 via the tip 66.

After the tab has been switched at area 14, the disk is moved forwardly to the hopper 16 of FIG. 1. A gap 98 below a rearward wall 100 of the hopper 16 allows the disk to enter the hopper from the tab-switching area 14. The floor of the hopper acts as an elevator to lift the disk above spring-loaded mechanisms 102 and 104 on the forward and rearward walls 100 and 106 of the hopper. As each disk is delivered to the hopper, the fourth solenoid 60 of FIG. 8 is initiated to lift the disk above the level of the spring-loaded mechanisms 102 and 104. The mechanisms allow the disk to move upwardly, but return to a position that prevents the disk from passing downwardly after the fourth solenoid 60 has been deactivated. Consequently, the disks are stacked within the hopper 16 after the tab has been switched.

Preferably, the disk-receiving hopper 16 includes an optical sensor that terminates operation of the apparatus after disks reach a preselected level within the hopper 16. A sensor 108 is shown in FIG. 8. Also shown in FIG. 8 is a sensor 110 that is designed for use with the disk-supply hopper 12. Each of the sensors 108 and 110 is connected to terminate operation of the apparatus 10. The sensor 110 detects a condition in which the disk-supply hopper 12 no longer contains disks. The sensor 110 may be aligned with the optical window 94 of the stationary plate 42 of FIG. 7. However, neither of the two sensors is critical to the invention.

While the automated apparatus 10 is shown as one in which disks are moved horizontally from the disk-supply hopper 12 to the disk-receiving hopper 16, other embodiments have been contemplated. Adjustments to movements initiated by the four solenoids 52, 56, 58 and 60 of FIG. 8 would allow movement and tab switching of a disk that is at an angle to the horizontal.

We claim:

1. An apparatus for switching a write-protect tab of a computer disk comprising:

disk-supply means for storing a plurality of computer disks;

means for delivering a disk from said plurality of computer disks to a tab-switching area;

means for securing said disk in a substantially fixed orientation within said tab-switching area such that a write-protect tab of said disk is fixed in a desired position to allow said write-protect tab to be switched, said desired position including an axis passing through and normal to a major surface of said write-protect tab;

reciprocating means aligned with said normal axis for securely contacting said write-protect tab when said disk is fixed in said desired position; and drive means for displacing said reciprocating means in a first direction generally parallel to said normal axis and in a second direction substantially perpendicular to said normal axis to switch said write-protect tab.

2. The apparatus of claim 1 further comprising means for collecting computer disks from said tab-switching area.

3. The apparatus of claim 1 wherein said reciprocating means includes a contact member having a plurality of teeth on a tip, said tip being positioned to contact said write-protect switch.

4. The apparatus of claim 3 wherein said tip is a tungsten carbide tip.

5. The apparatus of claim 3 wherein said teeth are aligned generally perpendicular to a direction of said displacement of said contact member by said drive means, each tooth having opposed first and second faces, said teeth including first teeth having second faces having a greater angle than said first faces, said greater angle being measured relative to said direction of said displacement of said contact member, said teeth further including second teeth that are mirror images of said first teeth such that said second faces of said second teeth have a lesser angle than said first faces of said second teeth, said lesser angle being measured relative to said direction of said displacement of said contact member.

6. The apparatus of claim 1 wherein said drive means includes a first solenoid operatively associated with said reciprocating means to move said reciprocating means substantially vertically into and out of contact with said write-protect tab, said drive means further including a second solenoid operatively associated with said reciprocating means to displace said reciprocating means horizontally.

7. The apparatus of claim 6 wherein said drive means includes circuitry for reversing displacement of said reciprocating means by said second solenoid.

8. An apparatus for switching a write-protect tab of a computer disk secured in a fixed position, said write-protect tab having a write-enabled position and a write-disabled position, said apparatus comprising:

a tip member having a plurality of teeth configured to securely engage a surface of a write-protect tab;

first means for displacing said tip member in a direction having a major component perpendicular to a major surface of said computer disk, said first means being positioned to press said teeth against said write-protect tab;

second means for displacing said tip member in a direction having a major component parallel to said major surface of said computer disk, thereby switching said write-protect switch; and reverse means, operatively associated with said second means, for selectively reversing said displacement of said tip member, said reverse means having a first condition in which said second means switches said write-protect tab from said write-enabled position to said write-disabled position, said reverse means having a second condition in which said second means switches said write-protect tab from said write-disabled position to said write-enabled position.

9. The apparatus of claim 8 wherein each tooth has opposed forward and rearward faces that intersect to form an edge aligned to contact said write-protect tab, said teeth including a first set having forward faces extending generally perpendicular to said write-protect tab and including a second set having rearward faces extending generally perpendicular to said write-protect tab.

10. The apparatus of claim 8 further comprising means for securing said computer disk in a horizontal position.

11. The apparatus of claim 10 wherein said first means includes a solenoid connected with respect to said tip member to displace said tip member along a vertical path, said second means including a solenoid connected with respect to said tip to displace said tip member along a horizontal path.

12. The apparatus of claim 8 wherein said tip member is formed of tungsten carbide.

13. The apparatus of claim 12 wherein said tip member is soldered to a metallic support device.

14. An apparatus for switching a write-protect tab of a computer disk comprising:

a disk-supply hopper for storing a plurality of computer disks;

delivery means for removing a disk from said hopper;

means for receiving said disk from said delivery means and securing said disk in a generally horizontal position;

a tip member vertically aligned with a write-protect tab of said disk;

a first solenoid operatively associated with said tip member to vertically displace said tip member, said first solenoid having an operation position in which said tip member is in contact with said write-protect tab;

a second solenoid operatively associated with said tip member to horizontally displace said tip member when said first solenoid is in said operation position; and means for removing said disk from said means for receiving following contact with said tip member.

15. The apparatus of claim 14 wherein said means for removing includes a disk-receiving hopper for storing a plurality of said computer disks.

16. The apparatus of claim 14 wherein said tip member is serrated.

17. The apparatus of claim 14 wherein said second solenoid further includes means for reversing the direction of said horizontal displacement of said tip member.

* * * * *